(12) United States Patent
van Diggelen (10) Patent No.: US 7,133,772 B2
(45) Date of Patent: Nov. 7, 2006

(54) METHOD AND APPARATUS FOR NAVIGATION USING INSTANTANEOUS DOPPLER MEASUREMENTS FROM SATELLITES

(75) Inventor: Frank van Diggelen, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 222 days.

(21) Appl. No.: 10/617,559

(22) Filed: Jul. 11, 2003

(65) Prior Publication Data
US 2006/0229805 A1   Oct. 12, 2006

Related U.S. Application Data

(60) Provisional application No. 60/399,647, filed on Jul. 30, 2002.

(51) Int. Cl.
*G01C 21/04* (2006.01)
*G01S 1/08* (2006.01)

(52) U.S. Cl. ............... 701/207; 701/213; 342/357.05; 342/357.09; 342/357

(58) Field of Classification Search .......... 342/357.05, 342/357.15, 357.09, 104, 357.08, 357.04; 701/207, 213, 214
See application file for complete search history.

(56) References Cited

U.S. PATENT DOCUMENTS

| | | | | |
|---|---|---|---|---|
| 4,797,677 | A | | 1/1989 | MacDoran et al. .......... 342/352 |
| 5,552,794 | A | | 9/1996 | Colley et al. ............... 342/357 |
| 5,663,734 | A | * | 9/1997 | Krasner ................. 342/357.12 |
| 5,808,581 | A | * | 9/1998 | Braisted et al. ........ 342/357.02 |
| 6,181,275 | B1 | * | 1/2001 | Chenebault et al. ... 342/357.05 |
| 6,411,892 | B1 | | 6/2002 | Van Diggelen ............. 701/207 |
| 6,417,801 | B1 | | 7/2002 | Van Diggelen ........ 342/357.08 |
| 6,597,311 | B1 | * | 7/2003 | Sheynblat et al. ...... 342/357.06 |
| 6,650,282 | B1 | * | 11/2003 | Martikka ............... 342/357.05 |
| 6,665,612 | B1 | * | 12/2003 | Brodie et al. ............... 701/213 |
| 6,718,174 | B1 | * | 4/2004 | Vayanos ................. 455/456.1 |
| 6,724,807 | B1 | * | 4/2004 | Krasner et al. ............. 375/143 |
| 2002/0093452 | A1 | * | 7/2002 | Hirata et al. ........... 342/357.12 |
| 2002/0111739 | A1 | * | 8/2002 | Jandrell ...................... 701/214 |
| 2003/0132879 | A1 | * | 7/2003 | Dooley et al. ......... 342/357.09 |

FOREIGN PATENT DOCUMENTS

WO    98/02762    1/1998

OTHER PUBLICATIONS

Djuknic, G.M.; Richton, R.E., "Geolocation and Assisted GPS", Feb. 2001, IEEE, vol. 34, Issue 2, pp. 123-125.*
Copy of International Search Report dated Dec. 2, 2003 for corresponding PCT application, PCT/US03/23672.

* cited by examiner

*Primary Examiner*—Thomas Black
*Assistant Examiner*—Christine M. Behncke
(74) *Attorney, Agent, or Firm*—Moser IP Law Group (57) ABSTRACT

A method and apparatus for locating position of a satellite signal receiver is described. In one example, a Doppler offset for each of a plurality of satellite signals relative to the satellite signal receiver is determined at a first time. A position of the satellite signal receiver is then computed using the Doppler offset for each of the plurality of satellite signals. In another example, at least one pseudorange between the satellite signal receiver and a respective at least one satellite is determined. At least one Doppler offset for a respective at least one satellite signal relative to the satellite signal receiver is also determined. A position of the satellite signal receiver is computed using the at least one pseudorange and the at least one Doppler offset.

22 Claims, 9 Drawing Sheets

METHOD AND APPARATUS FOR NAVIGATION USING INSTANTANEOUS DOPPLER MEASUREMENTS FROM SATELLITES

CROSS-REFERENCE TO RELATED APPLICATIONS

This application claims benefit of U.S. provisional patent application Ser. No. 60/399,647, filed Jul. 30, 2002, which is herein incorporated by reference.

BACKGROUND OF THE INVENTION

1. Field of the Invention

The present invention relates generally to the field of satellite positioning systems (SPS) and, more particularly, to processing of SPS signals.

2. Description of the Related Art

Global positioning system (GPS) receivers normally determine their position by computing times of arrival of signals transmitted from a multiplicity of GPS satellites. These satellites transmit as part of their message, both satellite positioning data as well as data regarding clock timing, so-called ephemeris data. The process of searching for and acquiring GPS signals, reading the ephemeris data for a multiplicity of the satellites, and computing the location of the receiver from this data is time consuming, often requiring several minutes. In many cases, this lengthy processing time is unacceptable and, furthermore, greatly limits battery life in miniaturized portable applications. GPS receiving systems have two principle functions: The first is the computation of a plurality of pseudoranges with respect to the various GPS satellites; and the second is the computation of the position of the receiver using the pseudoranges and the satellite timing and ephemeris data. The pseudoranges are simply the times-of-arrival of satellite signals measured by a local clock. Satellite ephemeris and timing data is extracted from the GPS signal once the GPS signal is acquired and tracked. As stated above, collecting this information normally takes a relatively long time (30 seconds to several minutes) and must be accomplished with a good received signal level in order to achieve low error rates.

Most GPS receivers utilize correlation methods to compute pseudoranges. These correlation methods are performed in real time, often with hardware correlators. GPS signals contain high rate repetitive signals called pseudorandom (PN) sequences. These codes have a binary phase reversal rate, or chipping rate, of 1.023 MHz and a repetition period of 1,023 chips for a code period of one millisecond. The code sequences belong to a family known as Gold codes, and each GPS satellite broadcasts a signal with a unique Gold code. For a signal received from a given GPS satellite, following a down conversion process to baseband, a correlation receiver multiplies the received signal by a stored replica of the appropriate Gold code contained within its local memory and then integrates or low pass filters the product in order to obtain an indication of the presence of the signal. This process is termed a correlation operation. By sequentially adjusting the relative timing of this stored replica relative to the received signal, and observing the correlation output, the receiver could determine the time delay between the received signal and the local clock. The initial determination of the presence of such an output is termed acquisition. Once acquisition occurs, the process enters the tracking phase in which the timing of the local reference is adjusted in small amounts in order to maintain a high correlation output. The correlation output during the tracking phase may be viewed as the GPS signal with the pseudorandom code removed or in common terminology "despread". The signal now has a bandwidth commensurate with a 50 bit per second binary phase shift key (BPSK) data signal that is superimposed on the GPS waveform.

In order to produce an initial three-dimensional location on the earth, signals must be received from four satellites if there is no prior knowledge of position of the receiver. If some knowledge of position is known, such as altitude, then only three satellite signals may be sufficient to initially fix the position of the receiver upon the earth. However, even with prior knowledge of position and three satellites, there are instances where two solutions for position may be found within a region (e.g., the United States) and, as such, the receiver will not be able to uniquely fix its initial position. Using the conventional process for obtaining the first acquisition of position on the earth, a receiver cannot operate with fewer than three satellites.

In many instances, a GPS receiver is operated in an urban canyon, for example, where buildings or other obstructions block the view of all but two or three satellites. In such an environment, conventional GPS receivers may not be able to uniquely determine an initial position. Once a GPS receiver has an initial position, there are well-known techniques for maintaining position with fewer than three satellites, usually using a Kalman filter, or similar filter, which includes a prediction of the location of the receiver based on recent position and clock information and sometimes velocity. However, the current invention is primarily concerned with an initial position fix, where there are no recent position fixes and, in some scenarios, no a-priori clock or time information.

Using conventional techniques to solve for an initial position, the handover word (HOW) must be decoded from the satellite in order to determine an unambiguous full pseudorange. Until the HOW is decoded (or an initial position is provided by some other means), the measured pseudorange is ambiguous, since GPS receivers measure pseudoranges modulo one millisecond (i.e. only the submillisecond part of the pseudorange is measured). It is time consuming and often impossible to decode the HOW, particularly with weak signals, or in environments (such as forests, or urban canyons) where the signal is blocked intermittently and frequently enough to prevent a standard GPS receiver from decoding HOW.

Therefore, there is a need in the art for a method and apparatus that uniquely determines an initial position of a GPS receiver using signals from fewer than four satellites or, where there are signals from four or more satellites, a method and apparatus that determines an initial position of a GPS receiver without decoding the HOW.

SUMMARY OF THE INVENTION

A method and apparatus for locating position of a satellite signal receiver is described. In one embodiment, a Doppler offset for each of a plurality of satellite signals relative to the satellite signal receiver is determined at a first time. A position of the satellite signal receiver is then computed using the Doppler offset for each of the plurality of satellite signals. In another embodiment, at least one pseudorange between the satellite signal receiver and a respective at least one satellite is determined. At least one Doppler offset for a respective at least one satellite signal relative to the satellite signal receiver is also determined. A position of the satellite signal receiver is computed using the at least one pseudorange and the at least one Doppler offset.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
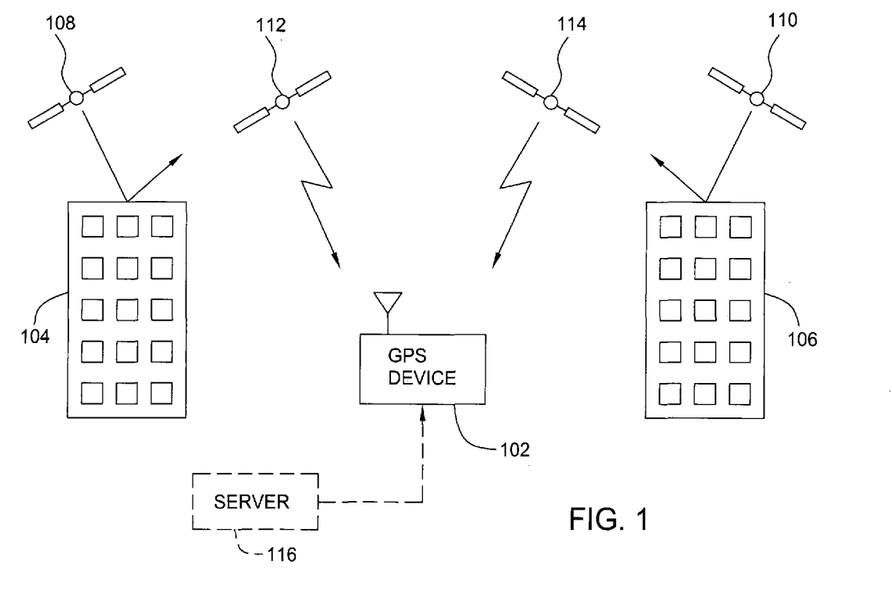
FIG. 1 depicts a block diagram showing an illustrative embodiment of a GPS device operating in an urban environment.

FIG. 1 depicts a block diagram showing an illustrative embodiment of a GPS device 102 operating in an urban environment. Objects, such as buildings 104 and 106, obstruct signals from satellites 108 and 110. As such, the GPS device 102 receives signals from less than four satellites, for example, satellites 112 and 114. Conventionally, a GPS receiver cannot uniquely determine an initial position (a "first fix") using only two satellites. Even if a third satellite were visible, a conventional GPS receiver would not be able to determine an initial position without some a-priori knowledge of approximate position.

As described in more detail below, the GPS device 102 of the invention measures Doppler shift in signals transmitted by the satellites in view ("Doppler measurements"), as well as pseudoranges, to obtain a first fix for position. As such, the GPS device 102 is capable of determining an initial position based on signals received from less than four satellites, without a-priori knowledge of approximate position. For example, the GPS device 102 may obtain a first fix for position using pseudoranges and Doppler measurements to only two satellites (e.g., satellites 112 and 114). Thus, the invention may advantageously operate in an urban environment, for example, where objects obstruct the view to all but two or three satellites. Moreover, the invention may operate using signals from only two or three satellites without receiving a-priori knowledge of approximate position.

In one embodiment, the GPS device 102 is coupled to a server 116, which provides aiding information to assist in satellite signal reception. Such aiding information may comprise satellite position information, for example, satellite ephemeris data, or a pseudo-range model derived from satellite position information. An exemplary system that propagates a pseudo-range model to a GPS device is described in commonly-assigned U.S. Pat. No. 6,453,237, issued Sep. 17, 2002, which is herein incorporated by reference in its entirety. Alternatively, GPS device 102 may receive satellite ephemeris data directly by decoding such data from the satellite signals. In either embodiment, ephemeris data provides the GPS device 102 with information regarding the position and velocity of the satellites in view (e.g., satellites 112 and 114).

Navigation using Doppler measurements from satellites is a well-known technique when done over a period of time in which the satellites move over a significant part of the sky. The first satellite navigation system, known as "Transit", used a technique of measuring a change in Doppler shift over a period of several minutes, as the satellite rose, passed through the visible sky, and then set. A similar technique may be used with GPS satellites, since they too move through the sky. However, such a technique would result in a long time-to-fix (e.g., many minutes, or even hours). In contrast to measuring a change in Doppler shift over a period of several minutes, the invention makes use of instantaneous Doppler measurements (i.e. Doppler measurements made over several milliseconds or, at most, seconds). Instantaneous Doppler measurements do not rely on the change in Doppler related to satellite movement during the observation interval. For simplicity, the term "Doppler measurements" as used in the following description means instantaneous Doppler measurements.

Figure 2:
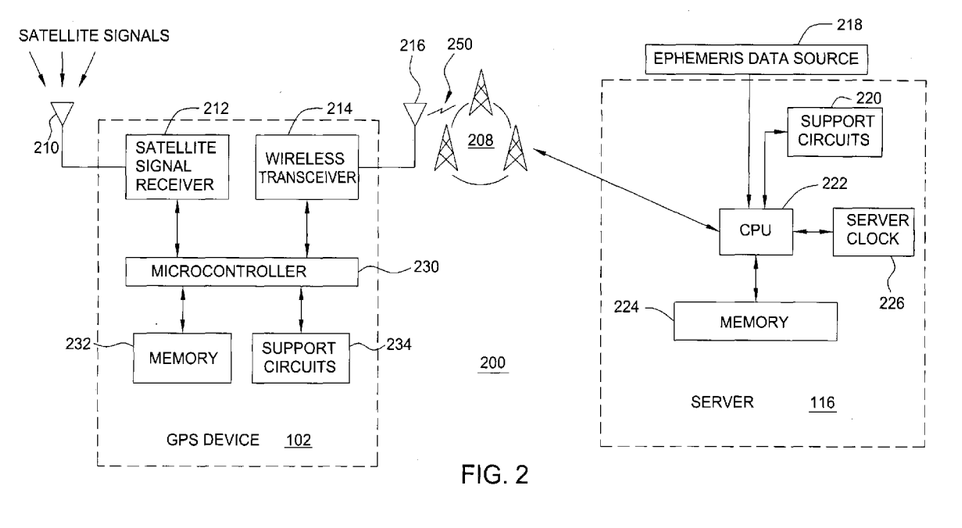
FIG. 2 depicts a block diagram showing an exemplary embodiment of a position location system in accordance with the invention.

FIG. 2 depicts a block diagram showing an exemplary embodiment of a position location system 200 in accordance with the invention. The position location system 200 comprises the GPS device 102 coupled to the server 116 via a wireless communication system 208. The GPS device 102 obtains Doppler measurements for signals transmitted by a plurality of satellites, for example, satellites 112 and 114. The GPS device 102 may also measure pseudoranges to a plurality of satellites, for example, satellites 112 and 114. In one embodiment, the GPS device 102 transmits the Doppler measurements and the pseudoranges (if measured) to the server 116 using the wireless communication system 208. The server 116 then uses the Doppler measurements (and the pseudoranges if measured) to solve for unknown position of the GPS device 102. Alternatively, the position computation may be performed within the GPS device 102, obviating the need to send the Doppler measurements and the pseudoranges to the server 116.

More specifically, the GPS device 102 illustratively comprises a satellite signal receiver 212, a wireless transceiver 214, a microcontroller 230, a memory 232, and support circuits 234. The support circuits 234 comprise well-known circuits that facilitate operation of the microcontroller 230, such as clock circuits, cache, power supplies, I/O interface circuits, and the like. The memory 232 may be random access memory, read only memory, removable storage, hard disc storage, or any combination of such memory devices.

The satellite signal receiver 212 receives satellite signals via antenna 210. The satellite signals may be transmitted by satellites of one or more satellite positioning systems, such as GPS, Galileo, Glonass, and the like. The satellite signal receiver 212 processes satellite signals to form pseudoranges in a well-known manner.

The pseudoranges measured by the satellite signal receiver 212 are coupled to the microcontroller 230. The microcontroller 230 computes Doppler measurements for the received satellite signals. In one embodiment, the microcontroller 230 obtains the Doppler measurements by computing the difference between pseudoranges measured at a first time and pseudoranges measured at a second time. That is, the microcontroller 230 derives the Doppler measurements from the rate of change of the pseudoranges. Alternatively, the microcontroller 230 may obtain the Doppler measurements by computing the difference between the expected frequency of the satellite signals and the actual frequency of the satellite signals as received by the satellite signal receiver 212. As such, the satellite signal receiver 212 does not necessarily have to measure pseudoranges in order to obtain the Doppler measurements.

In one embodiment, the pseudoranges and the Doppler measurements are coupled to the wireless transceiver 214. The wireless transceiver 214 transmits the pseudoranges and the Doppler measurements via an antenna 216 over a wireless communication link 250 to the wireless communication system 208. The wireless communication system 208 comprises, for example, a cellular telephone network. In turn, the wireless communication system 208 transmits the pseudoranges and the Doppler measurements to the server 116. The wireless transceiver 214 may also be used to receive aiding data from the wireless communication system 208 and the server 116 as described above.

The server 116 illustratively comprises a central processing unit (CPU) 222, support circuits 220, a memory 224, and a server clock 226. The support circuits 220 comprise well-known circuits that facilitate operation of the CPU 222, such as clock circuits, cache, power supplies, I/O interface circuits, and the like. The memory 224 may be random access memory, read only memory, removable storage, hard disc storage, or any combination of such memory devices. The server clock 226 may be used to provide a time-tag for when a set of pseudoranges and Doppler measurements by the GPS device 102 are received at the server 116.

Satellite ephemeris data, for all satellites represented by the pseudorange and Doppler data, is provided to the server 116 from an ephemeris data source 218. The ephemeris data source 218 comprises an external source of ephemeris, such as another satellite signal receiver located in the vicinity of server 116 with a clear view of the sky or a network of satellite signal receivers. An exemplary system for distributing ephemeris data is described in commonly-assigned U.S. Pat. No. 6,411,892, issued Jun. 25, 2002, which is herein incorporated by reference in its entirety. Note that, for simplicity, the term "ephemeris" is used to mean the satellite orbit parameters and satellite clock parameters.

In the general satellite navigation problem, there are nine unknowns:

Three position unknowns: x, y, z
Three velocity unknowns: $\dot{x}, \dot{y}, \dot{z}$
Three clock unknowns: $t_C, t_S, f_C$ where $t_C$ is the common mode timing error (usually a sub-millisecond value in GPS), $t_S$ is the absolute time tag error, and $f_C$ is the frequency error in a local oscillator within the GPS device 102. The absolute time tag error ($t_S$) occurs when the handover word (HOW) cannot be decoded from a satellite signal, and accurate time-of-day information is not available from any other source, such as the wireless communication system 208. As used herein, a quantity is "unknown" or "not known accurately" when that the quantity is not known accurately enough for the purpose of computing an accurate position. Thus, any quantity is "unknown" or "not known accurately" if it is required to compute it more accurately before the position can be accurately computed. For example, an "accurate position" may be considered as a position that is known within 10 meters; in this case $t_S$ would be considered unknown if it was not known to within 10 milliseconds, and $t_C$ would be considered unknown if it was not known to within 30 nanoseconds. Those skilled in the art will appreciate, however, that a position may be considered accurate if it is known within more or less than 10 meters, as desired.

Generally, the most critical information to be solved is the unknown horizontal coordinates—x and y—if the coordinate system is defined with x and y in the local horizontal plane. For the purposes of exposition, the coordinate system described herein is defined using the local horizontal plane, although the invention is not limited to such a coordinate system. As described in more detail below, the invention can solve for the initial (first fix) values of x and y with range and Doppler measurements from two or more satellites. Also, once a first fix has been obtained, the invention can solve for subsequent values of x and y with range and Doppler measurements from one or more satellites, without using a predicted position based on extrapolated velocity-times-time. Furthermore, if a-priori knowledge is available for the clock unknowns and velocity unknowns, and an approximate position is known, then the invention can solve for the initial (first fix) values of x and y with range and Doppler measurements from one or more satellites.

Figure 3:
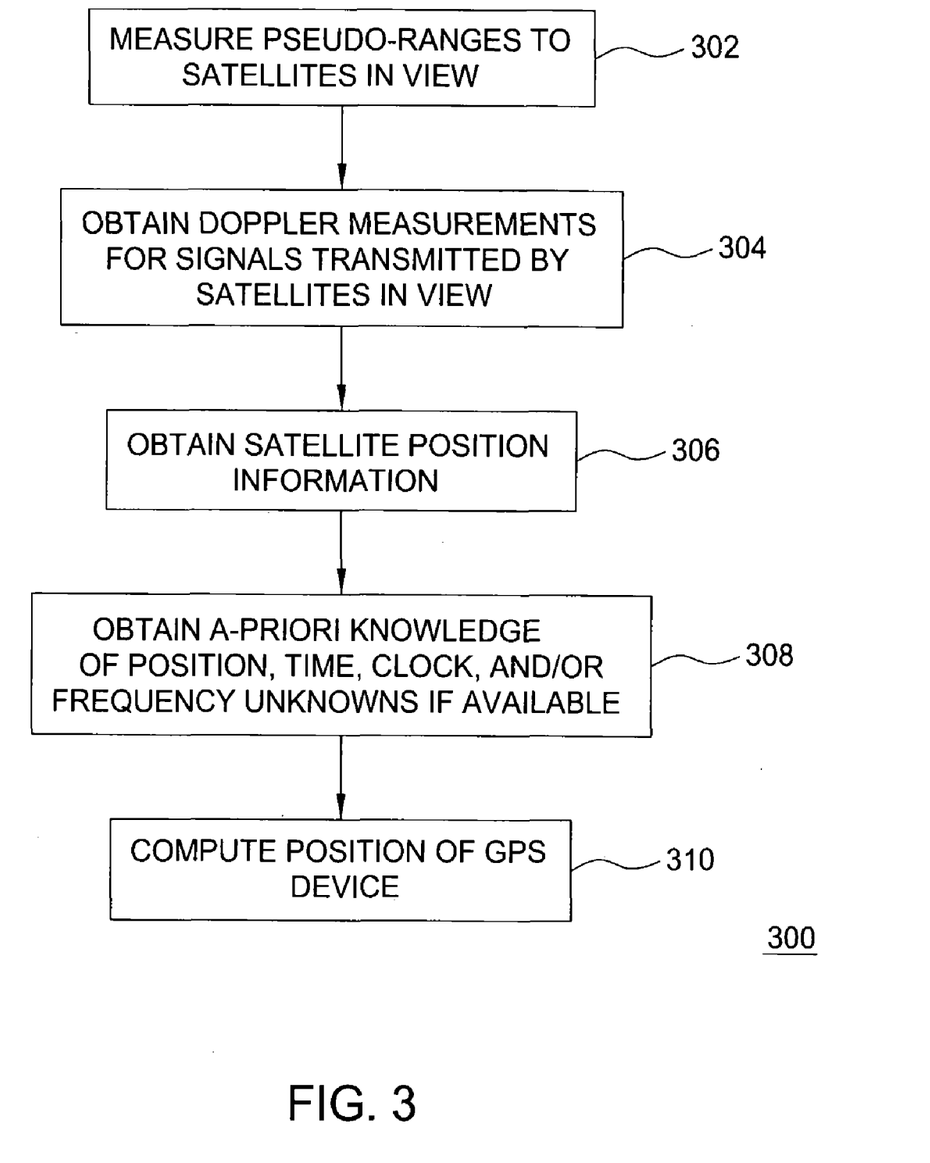
FIG. 3 depicts a flow diagram showing a process for computing position of a GPS device in accordance with the invention.

FIG. 3 depicts a flow diagram showing a process 300 for computing position of a GPS device in accordance with the invention. The process 300 begins at step 302, where pseudoranges are measured from the GPS device to satellites in view of the GPS device. At step 304, Doppler measurements are obtained for signals transmitted by the satellites in view of the GPS device. At step 306, satellite position information, such as ephemeris, is obtained. At step 308, a-priori knowledge of position, time, clock, velocity, and/or frequency unknowns is obtained if such a-priori knowledge is available. At step 310, an initial position for the GPS device is computed.

More specifically, in a first embodiment, a first fix for position of a GPS device is obtained with a single satellite, given a-priori knowledge of the clock and velocity unknowns and a-priori knowledge of approximate position. This embodiment may arise in practice if the GPS device is integrated within a cell-phone and has access to a wireless communication system. At step 302, a pseudorange is measured from the GPS device to one satellite. At step 304, a Doppler measurement is obtained for the signal transmitted by the one satellite. At step 308, an approximate position of the GPS device is obtained, for example, from the location of cell-towers within the wireless communication system. Precise time and frequency may be obtained from the wireless communication system, providing a-priori knowledge of $t_C$, $t_S$, and $f_c$. A-priori knowledge of velocity may be obtained either from an external measurement, or by assuming velocity equals zero (often a good assumption when the GPS device is being used by a person on foot). Of the nine unknowns (x,y,z, $\dot{x},\dot{y},\dot{z}$, $t_C$, $t_S$, $f_C$), seven can be fixed using the a-priori knowledge, leaving two unknowns, x and y. At step 310, the position of the GPS device is determined, as described geometrically below with respect to FIGS. 4–8.

Figure 4:
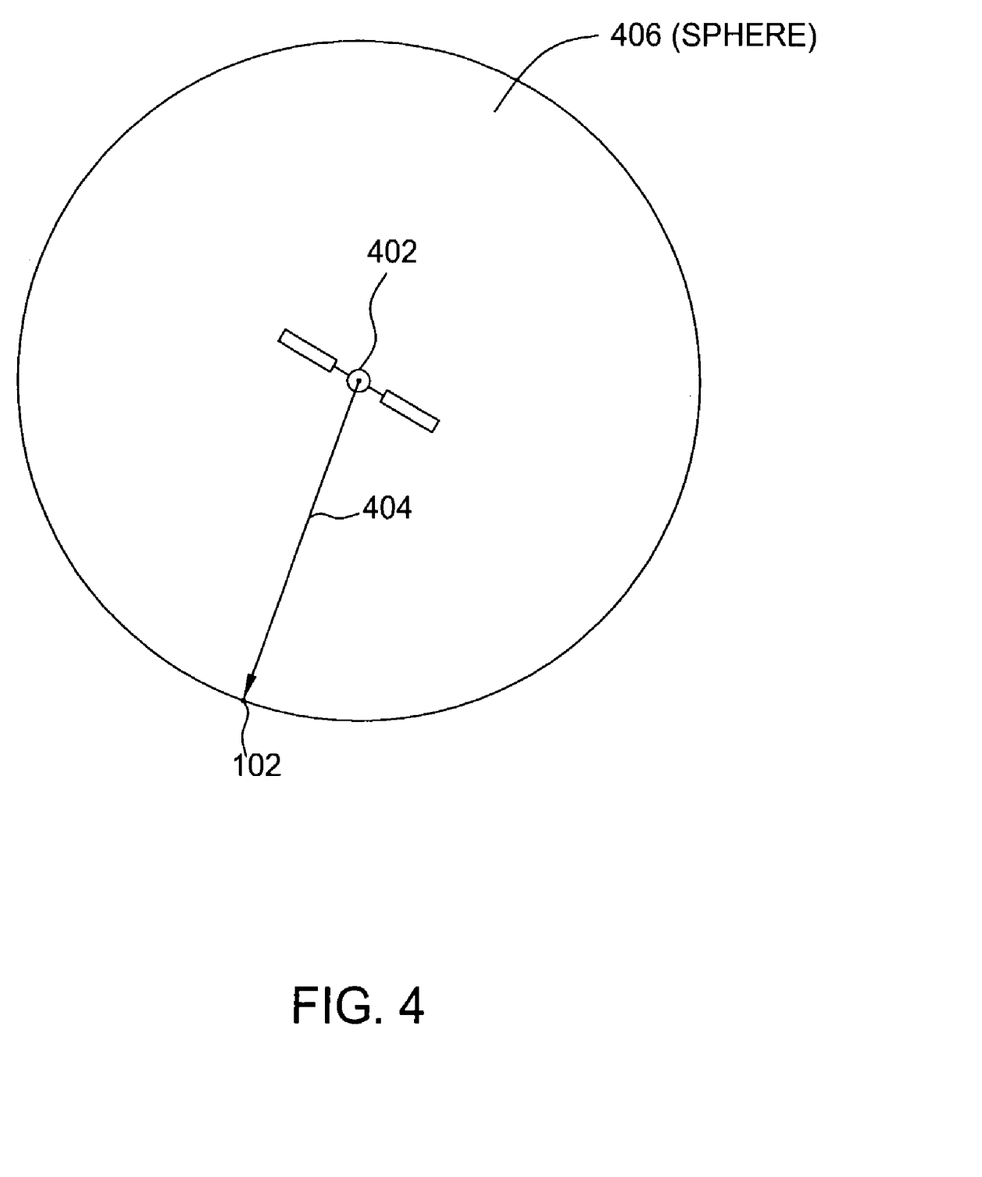
FIG. 4 depicts a geometric solution for position given a range to a satellite.
Figure 5:
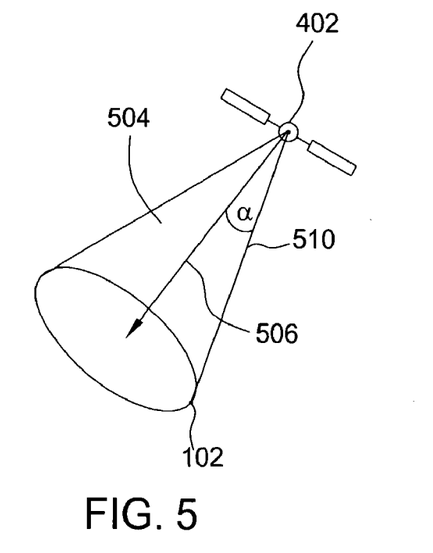
FIG. 5 depicts a geometric solution for position given a measurement of Doppler shift in a signal from a satellite.
Figure 6:
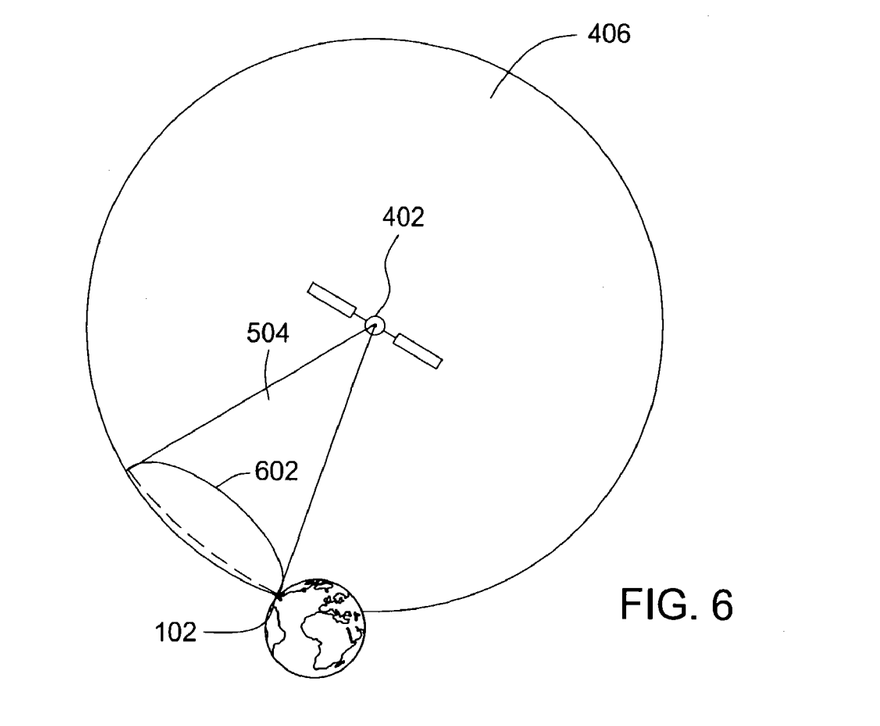
FIG. 6 depicts a circle of position formed by an intersection of the two geometric solutions shown in FIGS. 4 and 5.
Figure 7:
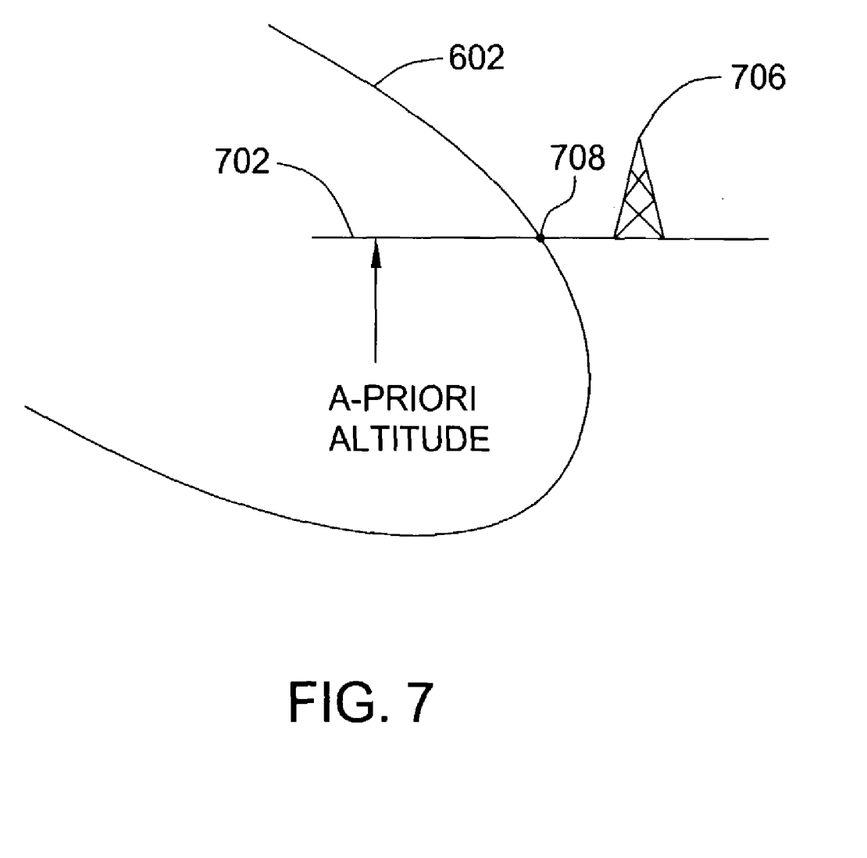
FIG. 7 depicts a unique position solution derived from the intersection of the circle of position of FIG. 6 and an a-priori altitude in a known region.
Figure 8:
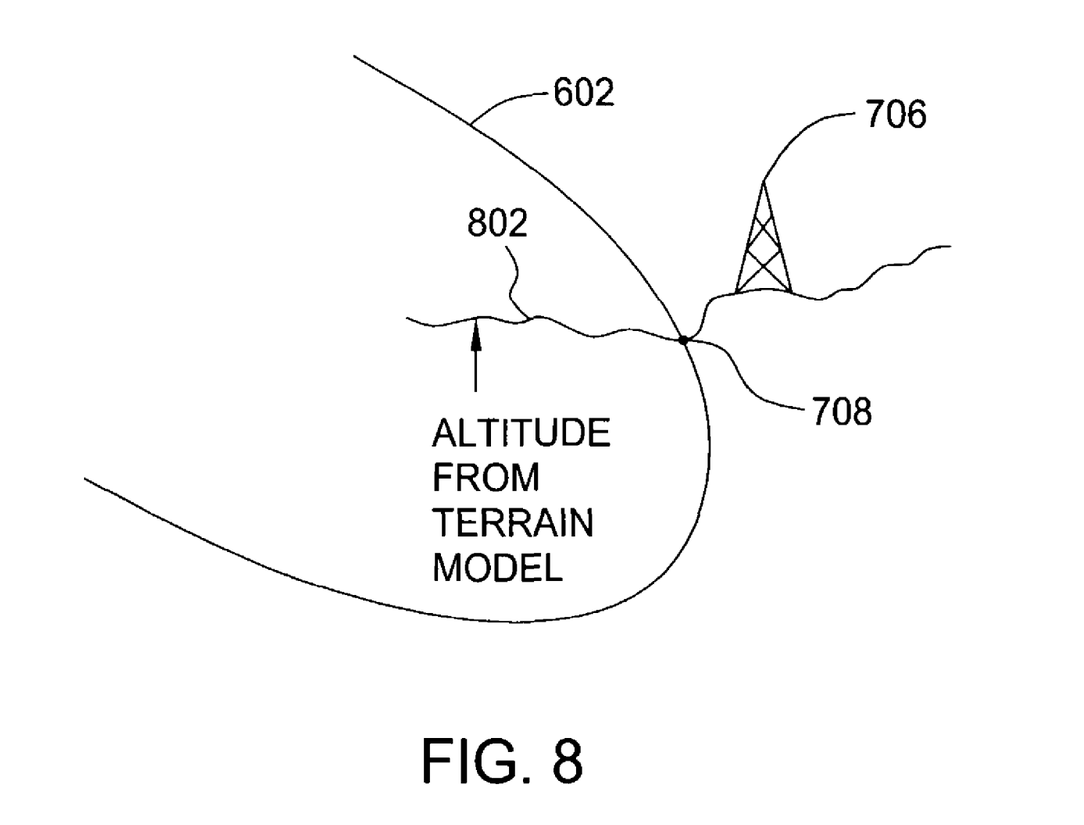
FIG. 8 depicts a unique position solution derived from the intersection of the circle of position of FIG. 6 and a terrain model in a known region.

In particular, FIG. 4 depicts a geometric solution for position given a range to a satellite. FIG. 5 depicts a geometric solution for position given a measurement of Doppler shift in a signal from a satellite. FIG. 6 depicts a circle of position formed by an intersection of the two geometric solutions shown in FIGS. 4 and 5. FIG. 7 depicts a unique position solution derived from the intersection of the circle of position of FIG. 6 and an a-priori altitude in a known region. FIG. 8 depicts a unique position solution derived from the intersection of the circle of position of FIG. 6 and a terrain model in a known region.

Referring to FIG. 4, with the clock parameters $t_C$ and $t_S$ known, the pseudorange becomes the geometric range by definition. As shown in FIG. 4, for a given satellite 402, the position of the GPS device 102 is confined to a sphere 406 having a radius 404 equal to the geometric range between the GPS device 102 and the particular satellite 402.

Referring to FIG. 5, velocity vector 506 for the satellite 402 is computed from the satellite position information (e.g., ephemeris data). If the GPS device 102 were in line with the velocity vector 506, the Doppler shift present in the satellite signal would be exactly known from the velocity vector 506. Since the GPS device 102 is not aligned with the trajectory of the satellite 402, the Doppler shift in the satellite signal is related to the angle between the line-of-sight vector from the GPS device 102 to the satellite 402 and the velocity vector 506. Specifically, the Doppler shift in a given satellite signal is the velocity vector 506 multiplied by the cosine of the angle between the velocity vector and the line-of-sight between the GPS device 102 and the satellite 402. Given a measurement of the Doppler shift at the GPS device 102 and the velocity vector 506, the angle between the velocity vector 506 and the line-of-sight can be determined. For the satellite 402, the position of the GPS device 102 is thus confined to a surface 510 of a cone 504 having a determined angle α equal to the angle between the velocity vector 506 and the line-of-sight between the GPS device 102 and the satellite 402. Note that the surface 510 of the cone 504 is made up of line-of-sight vectors from each possible location of the GPS device 102 to the satellite 402.

Referring to FIG. 6, the surface of the sphere 406 is always perpendicular to the line-of-sight vector along the surface 510 of the cone 504. Thus, the surface of position from the Doppler measurement (the cone 504) intersects the surface of position from the range measurement (the sphere 406) at right angles, thereby producing a circle of position 602.

Referring to FIG. 7, in general, the circle of position 602 will coincide with an a-priori altitude, in the vicinity of the a-priori position, at only one point. That is, the circle of position 602 intersects an a-priori altitude 702 in the vicinity of an a-priori position relative to a cell-tower 706 at a point 708. The intersection point 708 is the position of the GPS device 102. In a more sophisticated implementation, an a-priori altitude is not required, and is replaced by a terrain model, such as shown in FIG. 8. The intersection point 708 is now the intersection of the circle of position 602 and a terrain model 802 in the vicinity of the a-priori position relative to the cell tower 706. Terrain models and their use in GPS position solutions are discussed fully in commonly assigned U.S. Pat. No. 6,429,814, issued Aug. 6, 2002, which is incorporated herein by reference in its entirety.

Returning to FIG. 3, in a second embodiment, a first fix of position is obtained using two satellites, given a-priori knowledge of approximate position, but no a-priori knowledge of the clock unknowns. At steps 302 and 304, pseudoranges and Doppler measurements are obtained from the GPS device to two satellites. At step 308, an approximate position is obtained as described above. The unknown velocity may be obtained either from an external measurement, or by assuming velocity equals zero. At step 310, the position of the GPS device is computed, as described algebraically below.

The absolute time-tag error ($t_S$) may be obtained either from an external source, such as a wireless communication system if the system is synchronized to GPS time, or by decoding the Handover Word (HOW) from the satellite signals. The altitude parameter (z) may be obtained from the a-priori position information, or by using a terrain model as described above. This leaves four unknowns: x, y, $t_C$ and $f_C$. The four unknowns are related to the Doppler and pseudorange measurements by the following mathematical model:

$$\underline{y} = \begin{bmatrix} u_1 \\ u_2 \\ v_1 \\ v_2 \end{bmatrix} = \begin{bmatrix} \partial \rho_1/\partial x & \partial \rho_1/\partial y & c & 0 \\ \partial \rho_2/\partial x & \partial \rho_2/\partial y & c & 0 \\ \partial \dot{\rho}_1/\partial x & \partial \dot{\rho}_2/\partial y & 0 & c \\ \partial \dot{\rho}_1/\partial x & \partial \dot{\rho}_2/\partial y & 0 & c \end{bmatrix} \begin{bmatrix} x \\ y \\ t_C \\ f_C \end{bmatrix}$$

where: the elements of $\underline{y}$ are the a-priori pseudorange residuals $u_1$ and $u_2$ for the two satellites, formed by differencing the expected pseudo-ranges (expected for the a-priori position) and the measured pseudo-ranges; and the a-priori Doppler residuals $v_1$ and $v_2$ for the two satellites, formed by differencing the expected Doppler values (expected for the a-priori position and velocity) and the measured Doppler values. The elements in the matrix H are the first order terms of a Taylor expansion relating the residuals to the unknown updates of the a-priori parameters, $\rho_i$ is the pseudorange for satellite i, and $\dot{\rho}_i$ is the Doppler for satellite i. The unknown values x, y, $t_C$ and $f_C$ can now be solved for using standard linear algebra techniques known in the art.

Note that the above exposition shows the Doppler measurements as coming from the same satellites as the pseudorange measurements. However, the current invention is not restricted to using the same satellites for these different kinds of measurements, and the above exposition could equally well be shown with some pseudorange measurements coming from one set of satellites and some Doppler measurements from another set. Similarly, the pseudorange measurements could be taken at a different time from the Doppler measurements, provided the GPS receiver does not move by too great an amount in that period of time, or provided that the GPS receiver motion is properly modeled over that period of time.

Having solved for the unknown $t_C$ and $f_C$, (by using an assumed value of altitude), one can now hold the values of $t_C$ and $f_C$ fixed, and use the four measurements to solve for x,y and z for a true three-dimensional position. This process can be iterated to improve the accuracy of all of $t_C$, $f_C$, x, y, and z; including using a terrain model, as described above.

In a third embodiment, a first fix for position is obtained using two satellites, without a-priori knowledge of the clock unknowns and without a-priori knowledge of approximate position. In this embodiment, pseudoranges and Doppler measurements are obtained at step 302 and 304 for two satellites. No a-priori information is obtained at step 308. For example, the GPS device may not be able to receive a-priori information from a wireless communication system and may not have a-priori knowledge of approximate position. Thus, an initial position must be estimated. The estimate of initial position may be based on some knowledge of the general region (example, the country, or continent) in which the GPS device is operating. Then, one iteration of the mathematical model described above will produce a position that is a better estimate than the estimated initial position. This result is then used as a better a-priori position, and the process is repeated (using the same measurements, but the new a-priori position). Typically only a few iterations (e.g., fewer than 10) are needed before the result converges to the correct position of the GPS device.

Note that, in some cases, dependent on satellite geometry, two possible solutions may be found in the same general area (e.g., two solutions within the same country). However, this situation can be detected by monitoring the dilution of precision (DOP) associated with the satellite geometry. When DOP is high, then two possible solutions become more likely and a DOP mask may be used to determine whether a computed solution is valid with just two satellites, or whether more satellites are needed.

In a fourth embodiment, a first fix of position is obtained with three satellites, without a-priori knowledge of the clock unknowns and without a-priori knowledge of approximate position. If three satellites are in view, 6 independent pseudorange and Doppler measurements are obtained at steps 302 and 304. Thus, up to 6 unknowns may be solved. When only two satellites were in view, it was necessary to decode the HOW, or to obtain the absolute time-tag error ($t_S$) from an external source. In this embodiment, the absolute time-tag error ($t_S$) may be computed by including it as one of the unknowns in the equation relating the unknowns to the measurement residuals in the mathematical model. This allows a faster first fix of position, since it takes at last 6 seconds to decode the HOW, whereas it can take a few milliseconds, for example, to obtain sub-millisecond pseudorange measurements and Doppler measurements.

Full pseudoranges may be obtained in one of the following three ways: (1) decoding the HOW; (2) using a-priori knowledge of approximate position and time to resolve the integer portion of pseudorange; (3) using redundant measurements (from more than three satellites) and many guesses of approximate position and time to eliminate all approximate positions and times that are not within half a PN code epoch from the true position and time, and then using a remaining approximate position and time to resolve the integer millisecond portion of pseudo-range. Method (1) is well known in the art and typical of all standard GPS receivers. Method (2) is described in U.S. Pat. No. 5,365,450. Method (3) is described in commonly assigned U.S. Pat. No. 6,417,801, issued Jul. 9, 2002, which is incorporated herein by reference in its entirety. As described below, Doppler measurements may be used to solve for a position that is accurate enough to resolve the integer portion of the pseudoranges. This avoids the need to decode the HOW and avoids the need to obtain accurate (better than one code epoch or 293 km) a-priori position.

Figure 9:
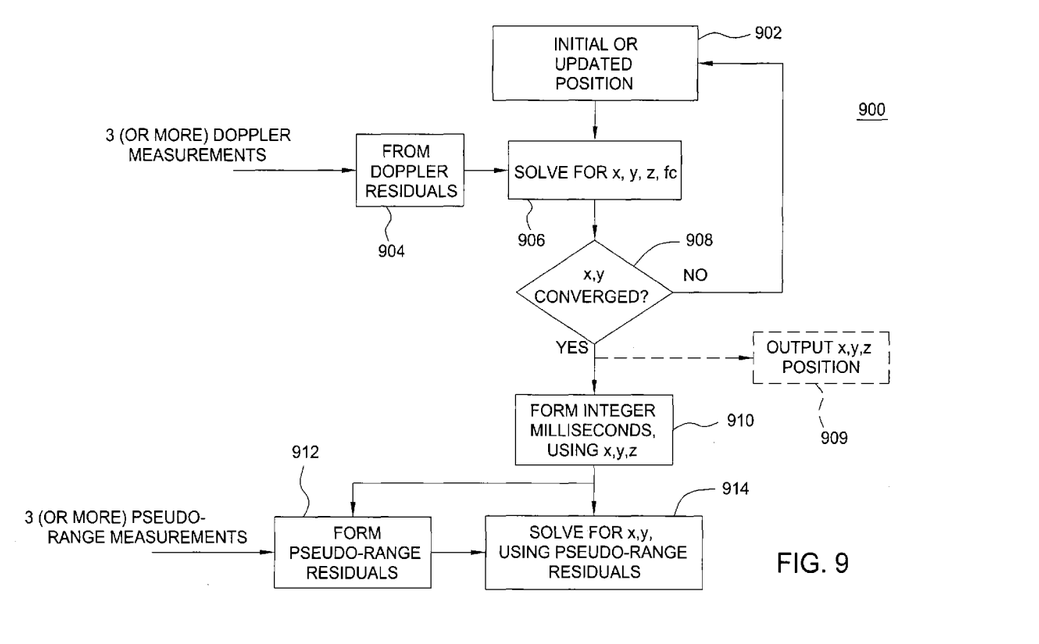
FIG. 9 depicts a flow diagram showing an embodiment of a process for computing pseudorange integer milliseconds and position using Doppler and pseudorange measurements in accordance with the invention.

More specifically, FIG. 9 depicts a flow diagram showing an embodiment of a process 900 for computing pseudorange integer milliseconds and position using Doppler and pseudorange measurements in accordance with the invention. The process 900 begins at step 902, where an initial or updated position is obtained. The initial position may simply be the center of the country or continent in which the GPS device is operating or, in some cases, an arbitrary guess. An updated position may be a previously computed position. At step 904, three or more Doppler residuals are formed by subtracting predicted Doppler measurements (predicted using the known satellite ephemeris and the assumed initial position) from the measured Dopplers.

At step 906, the Doppler residuals are used to solve for three of the unknowns x, y, and $f_C$. At this stage of process 900, the unknown values of velocity may be assumed to be zero. This assumption will lead to a reduction in position accuracy. However, if the absolute time-tag error ($t_S$) is not large (e.g., several seconds or less), then the position must only be accurate to within half an epoch (i.e., 146 km) to give the correct pseudorange integers. Speed of 100 km/h in the direction of the satellites will lead to errors in Doppler measurements of less than 146 Hz, which in turn contributes less than 146 km of error to the position. Thus, in almost all circumstances, the speed may safely be assumed to be zero at step 906. The two clock unknowns $t_C$ and $t_S$ may also be ignored at step 906. The unknown altitude, z, may be computed at step 906 by using a terrain model or an assumed altitude may be used.

At each application of the linearized equations in step 906 an improved estimate of x, y is obtained, and so the process naturally converges. At step 908, the values of x and y (position) are evaluated to determine if they have converged. If not, then the computed values for x and y are better estimates, and the process 900 proceeds repeats steps 902 through 906 using the better estimates of x and y until x and y do converge.

At step 910, the computed values of x, y, and z (an approximate position of the GPS device) are used to form integer millisecond values for the pseudorange measurements. U.S. Pat. No. 6,417,801 describes an exemplary process for obtaining integer values of pseudoranges using an approximate position.

At step 912, three or more pseudorange residuals are formed by subtracting the predicted pseudoranges (based on the known satellite ephemeris and computed approximate position x,y,z) from the measured pseudoranges (based on the measured sub-millisecond pseudo-ranges and the computed integer milliseconds). At step 914, accurate values of x and y are computed using the pseudorange residuals and a mathematical model as described above. In particular, depending on the number of pseudorange residuals computed, there are three or more independent measurements to solving three or more unknowns. This results in many implementation choices. For example, some unknowns, such as receiver velocity, may be assumed to be zero, or may be computed if enough independent measurements are available. In addition, fewer unknowns may be computed than there are independent measurements, resulting in an over-determined problem. This is useful for producing a-posteriori residuals, which can be used to check if the previous steps produced correct results (U.S. Pat. No. 6,417,801, for example, shows how to use a-posteriori residuals to check that the correct pseudorange integers were selected).

In the process 900, if the velocity of the GPS device is assumed to be zero, but in fact is not, the process 900 may still be used. However, there may be a decrease in the accuracy of the resultant position solution. With extra measurements, the unknown velocity values need not be assumed, but can be included in the matrix equation, and computed.

Figure 10:
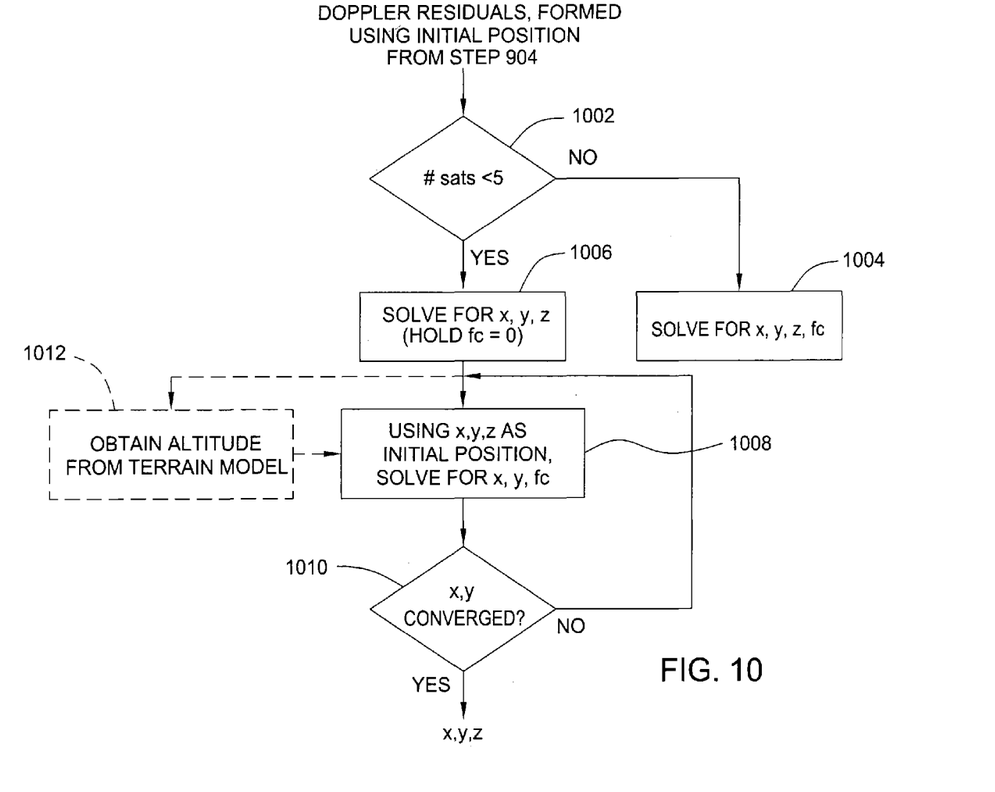
FIG. 10 depicts a flow diagram showing an embodiment of the position computation the process of FIG. 9 in accordance with the invention.

FIG. 10 depicts a flow diagram showing an embodiment of the position computation process 906 in accordance with the invention. If there are fewer than five Doppler residuals computed at step 904, than process 906 proceeds from step 1002 to step 1006. Otherwise, if there are more than five Doppler residuals computed at step 904, then process 906 proceeds from step 1002 to step 1004, where the values of x, y, z, and $f_c$ are computed directly as described above.

At step 1006, the values of x, y, and z are computed while assuming $f_c$ is zero. The values of x, y, and z will be close enough to the position of the GPS device that the altitude of the GPS device can be fixed. The altitude can be fixed at some nominal value, such as sea level, or a terrain model may be used at step 1012. Once the altitude is fixed, the values of x, y, and $f_c$ are computed at step 1008. At step 1010, the values of x and y are evaluated to determine if they have converged. If not, then the computed values for x and y are better estimates, and the process 906 repeats step 1008 using the better estimates of x and y until x and y do converge.

By including the Doppler measurements in the navigation equations, as described throughout this description, one has twice as many independent measurements as with classical GPS (using only pseudorange measurements), and thus there is far more opportunity to use techniques that rely on redundant measurements, such as integer fixing techniques (described, for example in U.S. Pat. No. 6,417,801), and Integrity Monitoring, and Fault Detection techniques that are well known in the art.

The position accuracy derived from Doppler measurements will in general not be as good as the accuracy derived from pseudorange measurements. To take this properly into account, the measurements and the matrix equations must be weighted appropriately, in ways well known in the art. For the United States GPS system (with satellites at approximately 20,000 km altitude), the observed Doppler frequency changes by approximately one Hertz with each kilometer of movement of the observer on the earth. Correspondingly the accuracy of a position derived from instantaneous Doppler measurements will be approximately 1 km per Hertz of measurement error. A typical frequency lock loop can measure Doppler to a tenth of a Hertz, and thus position accuracy will be around 100 meters. By observing carrier phase cycles, Doppler can be measured to better than one-thousandth of a Hertz (for example: by tracking carrier phase coherently for 60 seconds, and measuring the fractional phase to 1 cm precision, Doppler is determined to 1 cm/(60*carrier wavelength)=1/(60*19) Hz<1 milliHertz) this can produce position accuracy better than 1 meter. Better Doppler measurements will lead to yet better accuracy.

The forgoing embodiments have described implementations where both Doppler measurements and pseudorange measurements have been used to compute position. However, those skilled in the art will readily appreciate that the instantaneous Doppler measurements alone may suffice for computing a position. In yet another embodiment, the process 900 may terminate after step 908, yielding an x, y, and z position as an output at step 909. As described above, a position determined using instantaneous Doppler measurements may have an accuracy better than 1 meter.

Although the invention has been described as using ephemeris data for obtaining satellite orbits and clock parameters, equivalent descriptions of such parameters can also be used. There are many equivalent descriptions of the satellite orbits that can be used, including descriptions of the orbits as viewed from the mobile device. The satellite ephemeris could be replaced by a model of the expected pseudoranges, a model of the expected geometric ranges and a clock model, or by another combination of models that describe the satellite orbits and/or clock parameters. Since all these models serve similar purposes, the term "ephemeris" as used hereinabove means satellite orbital parameters, satellite clock parameters, or like type functionally equivalent data.

In the preceding discussion, the invention has been described with reference to application upon the United States Global Positioning System (GPS). It should be evident, however, that these methods are equally applicable to similar satellite systems, in particular, any satellite system in which a plurality of satellites have known accurate reference frequencies so that the only unknown frequencies are the Doppler offsets themselves, and the frequency error of the local oscillator in the satellite signal receiver (this frequency error has been denoted $f_C$ in the above discussion). For example, the present invention may be used with the Russian Glonass system and the European Galileo system, or any combination of the Glonass system, the Galileo system, the GPS system, and other satellite systems that broadcast satellite signals having known accurate reference frequencies. Thus, the term "GPS" as used herein includes such alternative satellite positioning systems.

While the foregoing is directed to illustrative embodiments of the present invention, other and further embodiments of the invention may be devised without departing from the basic scope thereof, and the scope thereof is determined by the claims that follow.

The invention claimed is:

1. A method of locating position of a satellite signal receiver, comprising:
   determining a Doppler measurement for each of a plurality of satellite signals relative to the satellite signal receiver at a first time;
   computing an initial position of the satellite signal receiver using the Doppler measurement for each of the plurality of satellite signals;
   forming Doppler residuals using the initial position and the Doppler measurements for each of the plurality of satellite signals;
   relating the Doppler residuals to a change in the initial position; and
   computing an update of the initial position.

2. The method of claim 1, wherein the initial position is a first fix of position for the satellite signal receiver.

3. The method of claim 1, wherein each of the plurality of satellite signals is associated with a predefined reference frequency.

4. The method of claim 1, wherein the plurality of satellite signals comprises at least one of a global positioning system (GPS) signal, a Galileo system signal, and a Glonass system signal.

5. The method of claim 1, wherein computing an initial position of the satellite signal receiver comprises:
   obtaining an approximate position of the satellite signal receiver from a wireless communication system.

6. The method of claim 1, wherein the initial position is an arbitrary location.

7. The method of claim 1, wherein the initial position is a center of a country or a continent in which the satellite signal receiver is operating.

8. The method of claim 1, further comprising:
   computing a frequency error associated with an oscillator of the satellite signal receiver using the Doppler measurement for each of the plurality of satellite signals.

9. The method of claim 1, further comprising:
   computing velocity of the satellite signal receiver using the Doppler offset for each of the plurality of satellite signals.

10. A method of locating position of a satellite signal receiver, comprising:
  determining at least one pseudorange between the satellite signal receiver and a respective at least one satellite;
  determining at least one Doppler measurement for a respective at least one satellite signal relative to the satellite signal receiver;
  computing an initial position of the satellite signal receiver using the at least one pseudorange and the at least one Doppler measurement;
  forming Doppler residuals using the initial position and the at least one Doppler measurement;
  forming pseudorange residuals using the initial position and the at least one pseudorange;
  relating the Doppler residuals and the pseudorange residuals to a change in the initial position; and
  computing an update of the initial position.

11. The method of claim 10, wherein the at least one satellite signal is respectively transmitted by the at least one satellite.

12. The method of claim 10, wherein the at least one satellite signal is transmitted by a respective at least one additional satellite.

13. The method of claim 10, wherein the position is a two-dimensional position comprising x and y coordinates in a horizontal plane.

14. The method of claim 10, wherein computing an initial position of the satellite signal receiver comprises:
  obtaining an approximate position of the satellite signal receiver from a wireless communication system.

15. The method of claim 10, wherein the initial position is an arbitrary location.

16. The method of claim 10, wherein the initial position is a center of a country or a continent in which the satellite signal receiver is operating.

17. The method of claim 10, wherein the at least one pseudorange is a sub-millisecond pseudorange.

18. The method of claim 17, wherein the computing step comprises:
  computing an initial position of the satellite signal receiver using the at least one Doppler measurement;
  computing an integer millisecond portion of the at least one pseudorange using the initial position;
  forming pseudorange residuals using the at least one pseudorange and the initial position; and
  computing an update of the initial position.

19. The method of claim 10, wherein the position is a first fix of position for the satellite signal receiver.

20. The method of claim 10, further comprising:
  computing a frequency error associated with an oscillator of the satellite signal receiver using the at least one Doppler measurement and the at least one pseudorange.

21. The method of claim 10, further comprising:
  computing a time error associated with a clock of the satellite signal receiver using the at least one Doppler measurement and the at least one pseudorange.

22. The method of claim 10, further comprising:
  computing velocity of the satellite signal receiver using the at least one Doppler measurement and the at least one pseudorange.

* * * * *